United States Patent

[11] 3,543,673

| [72] | Inventors | James McDevitt;<br>Victor F. Hilderbrand, Clearwater, Florida |
|---|---|---|
| [21] | Appl. No. | 813,890 |
| [22] | Filed | April 7, 1969 |
| [45] | Patented | Dec. 1, 1970 |
| [73] | Assignee | Ken Smith<br>St. Petersburg, Florida |

[54] ELECTRICAL DEEP DISH COOKING UNIT
6 Claims, 7 Drawing Figs.

[52] U.S. Cl. .................................................. 99/358,
13/18, 219/288, 219/295
[51] Int. Cl. .................................................. H05b 3/60
[50] Field of Search .......................................... 219/284,
295, 288, 289, 290; 99/253, 358, 171; 13/6, 14,
18, 23

[56] References Cited
UNITED STATES PATENTS
1,945,705  2/1934  Ross ................................. 219/295X

| 2,564,579 | 8/1951 | Parmenter et al. ........... | 99/253X |
| 3,062,663 | 11/1962 | Furgal et al. ................. | 99/358X |
| 3,230,861 | 1/1966 | Korr ............................. | 99/358 |
| 3,235,646 | 2/1966 | Sens ............................. | 13/6 |
| 3,245,338 | 4/1966 | Korr ............................. | 99/358 |
| 3,358,067 | 12/1967 | Dillon et al. ................. | 13/23 |
| 3,388,205 | 11/1968 | Haavik et al. ................ | 219/284X |

*Primary Examiner* — Volodymyr Y. Mayewsky
*Attorney* — Karl L. Spivak

ABSTRACT: An electrical deep-dish cooking unit including a cooker plate and at least one set of positive and negative contact rings affixed about an opening therein to thereby receive diametrically positioned electrodes which are affixed to a cooking dish and are so positioned as to contact the said contact rings when the dish is placed within the said opening. The electrodes position upon the sides of the cooking dish in spaced relationship and the food to be cooked contacts the electrodes to thereby complete an electrical circuit across the said contact rings.

Patented Dec. 1, 1970
3,543,673
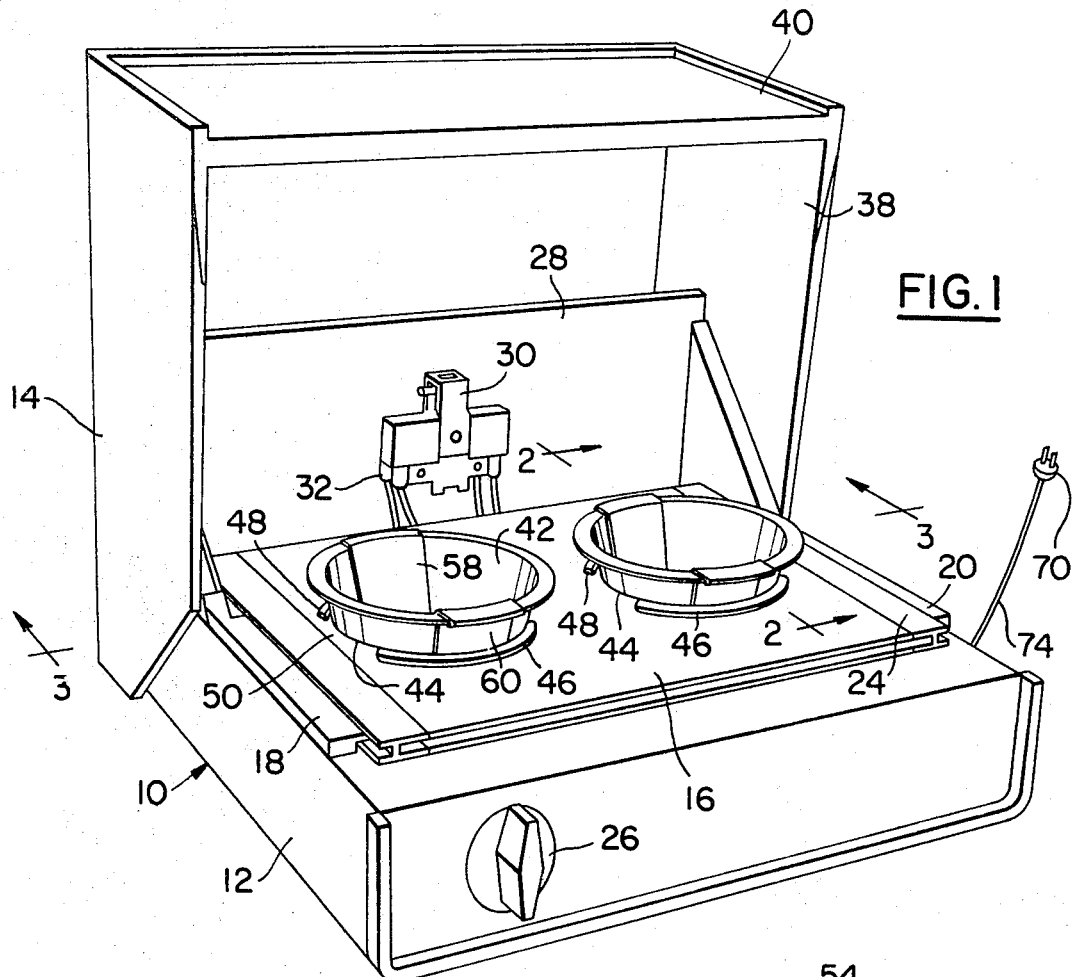
FIG. 1
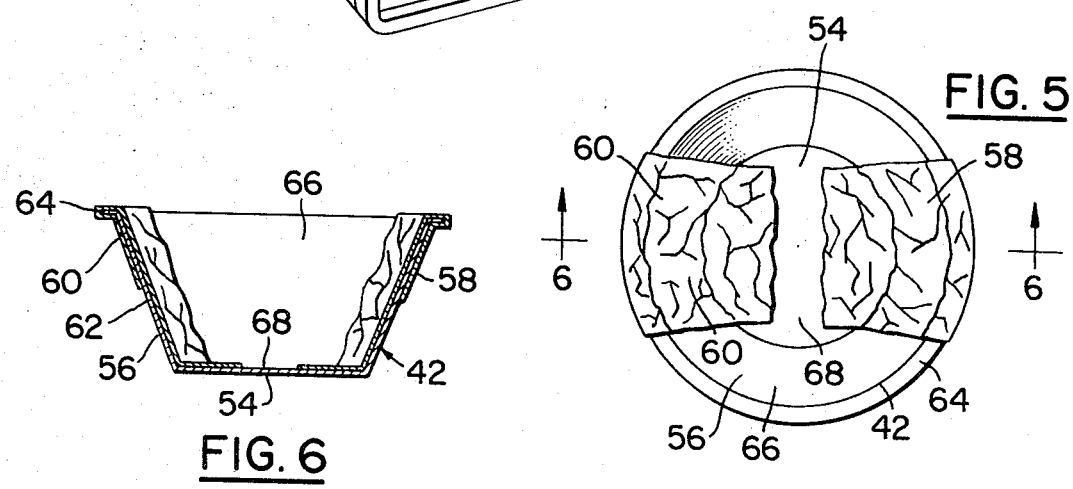
FIG. 6
FIG. 5
INVENTORS.
JAMES McDEVITT
VICTOR F. HILDEBRAND
BY Karl L. Spivak
ATTORNEY.

Patented Dec. 1, 1970
3,543,673
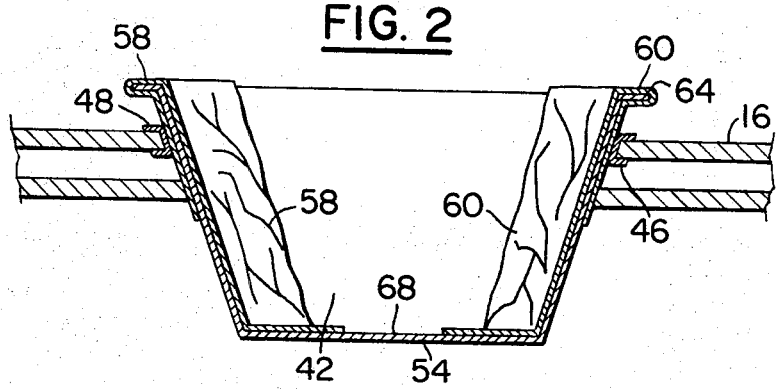
FIG. 2
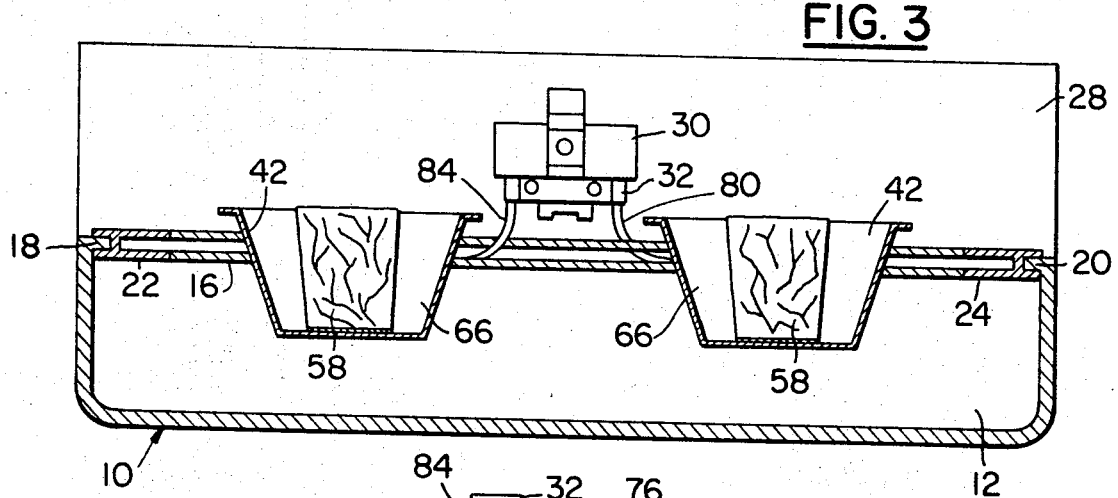
FIG. 3
FIG. 4
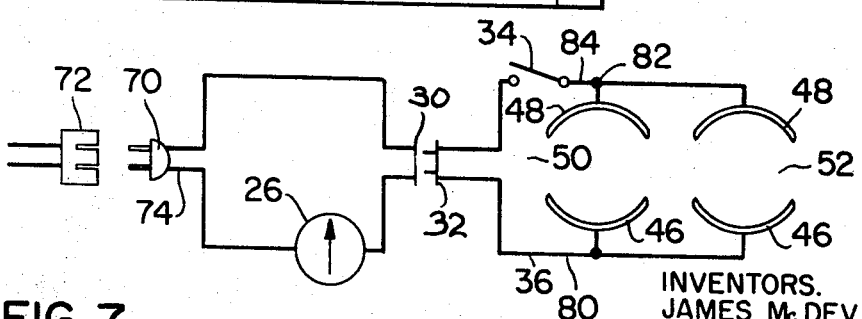
FIG. 7
INVENTORS.
JAMES McDEVITT
VICTOR F. HILDEBRAND
BY
*Karl L. Spivak*
ATTORNEY.

ELECTRICAL DEEP DISH COOKING UNIT

The present invention relates to the general field of cooking devices, and more particularly, is directed to an electrical direct-contact-type of cooking unit wherein electrical current is applied directly across a pair of electrodes affixed to the food-containing dish.

This invention relates to an electrical cooking unit that is particularly suitable for use as a food-vending device. It is also suitable for restaurant, home or other use wherein foods suitable for deep-dish cooking can be prepared for consumption. Such food include beef stew, chili, soup, spaghetti, chicken a la king and similar dishes that are semiliquid in consistency. It is contemplated that the foods can be packaged at a factory in the special container included within the scope of this invention, and then the entire food package may be either frozen or refrigerated as desired so as to prevent food spoilage prior to use.

When it is desired to heat the food within the special container hereinbefore mentioned, the container is applied to the electrical cooking unit with the container electrodes positioned to engage the cooking unit contact rings. Power from a conventional electrical circuit is then applied by the electrical cooking unit to either side of the said contact rings in well-known manner in an open electrical circuit. The circuit as hereinafter more fully explained, is open across the contact ring to therein receive the special food container. This open portion of the circuit is automatically closed by the food itself by contact with the container electrodes which in turn are positioned to contact the electric cooking unit contact rings. With the circuit thus completed, electrical current passes directly through the food which is thereby heated from the refrigerated or frozen condition to a palatable, edible temperature in an extremely short period of time.

Prior art electrical cooking units generally consisted of a resistance element upon which a container such as a conventional cooking pot was placed and the food was then placed within the cooking container. In view of the relatively long period of time necessary for the resistance type of cooking unit to reach maximum heat and in view of the inefficiencies of such a circuit occasioned by loss of heat to the atmosphere, loss of heat absorbed by the cooking container itself and other inefficiencies, such type of cooking normally takes an extended period of time in order to heat the food to the desired temperature. Other types of electrical cooking units have also been employed such as those generally designated as "infrared" type of units. The "infrared" type of heating units are generally relatively costly to construct and these too suffer from built-in inefficiencies which result in rather extended lengths of cooking time required for complete satisfaction.

The present device, and contrasted with the prior art cooking equipment, is extremely simple in construction and highly efficient in operation so that cooking time may be thereby minimized. For example, by utilizing the present invention, it is possible to cook an individual 8 ounce meal packaged and stored in the special container provided with the invention in a period of 45 seconds or less. No other unit presently available can equal this speed. Accordingly, the invention is ideally suitable for use in any environment wherein normal electrical current is available and wherein faster cooking time is desirable.

Accordingly, it is an object of the present invention to provide an improved device of the type set forth.

It is another object of the present invention to provide an improved electrical cooking unit including a cooking plate having round, container receiving openings therein.

It is another object of the present invention to provide a novel electrical cooking unit including a cooking plate having circular openings therein, the said circular openings being provided respectively with positive and negative contact rings.

It is another object of the present invention to provide a novel electrical cooking unit designed to accommodate a food container, the said food container having a positive and a negative electrode.

It is another object of the present invention to provide a novel electrical cooking unit having split positive and negative contact means designed to receive and to contact food container positioned electrodes.

It is another object of the present invention to provide a novel electrical cooking unit having curved positive and negative electrical contacts and designed to accommodate in electrical contact a food container having similarly curved positive and negative electrodes.

It is another object of the present invention to provide a novel electrical cooking unit that is inexpensive in manufacture, simple in construction and trouble free when in use.

Other objects and a fuller understanding of the invention will be had by referring to the following description and claims of a preferred embodiment thereof taken in conjunction with the accompanying drawings wherein like reference characters refer to similar parts throughout the several views and in which:

FIG. 1 is a front perspective view of the invention.

FIG. 2 is a cross-sectional view taken along line 2-2 of FIG. 1, looking in the direction of the arrows.

FIG. 3 is a cross-sectional view taken along line 3-3 of FIG. 1, looking in the direction of the arrows.

FIG. 4 is a bottom schematic view of the cooking plate showing the wiring arrangement.

FIG. 5 is a top plan view of a food container.

FIG. 6 is a cross-sectional view taken along line 6-6 of FIG. 5, looking in the direction of the arrows.

FIG. 7 is a schematic wiring diagram.

Although specific terms are used in the following descriptions for the sake of clarity, these terms are intended to refer only to the particular structure of our invention selected for illustration in the drawings, and are not intended to define or limit the scope of the invention.

Referring now to the drawings, we show a novel electrical deep-dish cooking unit generally designated 10 including an enclosing base 12 and a cover 14 which is hingedly arranged above the base and includes an electrical safety interlock as hereinafter more fully explained. A cooking plate 16 horizontally positions at the top of the base 12 and is fabricated for ready removal by means of the laterally spaced, horizontal base affixed tracks 18, 20, and the respectively cooperating, cooking plate connected slides 22, 24. A timing and circuit control switch 26 positions at the front of the base 12 to thereby facilitate easy manual operation of the electrical cooking circuit.

The enclosing base 12 terminates rearwardly in a transverse, vertically extending back plate 28 which rearwardly extends above the surface of the cooking plate 16 and carries a female-type electrical contact receptacle 30 for cooperating, readily disengageable contact with the cooking plate affixed electrical plug 32 in conventional manner. An electrical circuit interlock 34 positions upon the base 12 in alinement with a portion of the cover 14 and is wired to open the electrical circuit 36 when the cover is rotated to the open position 38 as illustrated in FIG. 1. When the cover 14 pivots about its hinges to overlie the base 12, the electrical interlock 34 closes to thereby permit current to flow past the safety interlock 34 through the electrical circuit 36 in well-known manner. An access opening 40 is provided in the front of the cover 14 to thereby permit food to be introduced into and taken from the cooking unit 10 when the cover is in its closed and operating position and also to permit visual observance of the cooking operations.

The cooking plate 16 may be fabricated from any suitable rigid material that is electrically nonconductive and of sufficient strength to adequately support the weight of the food containers 42 without undue stress or deflection. A plurality of container-receiving openings 44 are provided through the cooking plate 16 and are preferably circularly formed to support the cooking containers 42 therein. As hereinafter more fully explained, the cooking containers 42 are fabricated to a generally frustoconical configuration to facilitate electrical circuit engagement within the openings 44. A pair of generally arcuate, spaced, contact rings 46, 48 inwardly overlie portions of the opening 44. Care must be exercised to provide diametrically opposed circuit opening spaces 50, 52 between the adjacent ends of the contact rings 46, 48. In this manner, the electrical circuit 36 will normally be open across the contact rings 46, 48 and no electrical current can thereby flow.

Referring now to FIGS. 5 and 6, we show a food container 42 fabricated with a closed bottom 54 and integral, upwardly extending sidewalls 56 fabricated to a frustoconical configuration and manufactured of plastic or moisture resistant paperboard or other material of suitable properties to contain the food (now shown) when both in the refrigerated and stored condition and also when heated to an elevated temperature just prior to consumption. In addition to the property being moisture resistant, the container 42 must also be fabricated from materials that are electrically nonconductive so that the body of the container will be completely uneffected by the electrical energy delivered at the contact rings through the electrical circuit 36. Each container 42 is provided with a pair of thin, flat electrodes 58, 60 which may be fabricated of metallic foil or other suitable electrically conductive material. The electrodes 58, 60 comprise a single elongated length of thin, flat material which may be laminated or otherwise secured to the exterior and interior surfaces of the sidewall 56 in a continuous, electrically conductive strip. As best seen in FIG. 6, the electrodes 58, 60 terminate at one end thereof on the outside 62 of the container 42 and depend from the top peripheral lip 64 a distance sufficient to assure positive contact upon the contact rings 46, 48 when the container 42 is placed within cooking plate opening 40 for food-heating purposes.

The electrodes 58, 60 extend upwardly over the container lip 64 and then downwardly along the inside of the sidewall 66 and across the inside of the container bottom 54. The electrodes 58, 60 terminate downwardly and inwardly along the container bottom 54 leaving a circuit opening space 68 therebetween of sufficient width to assure that electrical current from the circuit 36 will not jump across the open space 68. The foil electrodes 58, 60 as best seen in FIG. 5, are fabricated to a relatively wide configuration and extend completely from the lip 64 of the container down the sidewall 66 to cover a significant portion of the inside of the container bottom 54 and sidewall 66. In this manner, by providing electrodes of relatively wide dimensions, a large area of contact with the food stored within the container 54 is thereby provided. When the electrodes 58, 60 are energized upon direct contact with the contact rings 46, 48 a large area of contact with the food (not shown) occurs due to the width and length of the foil electrodes actually available within the container 42. It will be appreciated that the food itself acts as an electrical conductor and thereby serves to complete the open circuit across the electrodes 58, 60 by providing circuit continuity across the open space 68. In view of the large area of contact between the food and the electrodes 58, 60 and the fact that the food serves as a portion of the electrical circuit, large surface areas of the food being cooked are immediately heated due to electrical energy generated through the food itself by the circuit 36. This food in turn heats inwardly adjacent particles of food in accordance with well-established principles of heat transfer. The relatively large exposed surfaces of the electrodes function to greatly increase the speed of cooking and thereby permit extraordinarily fast heating of the food from refrigerated temperatures to edible temperatures.

The bottom 76 of the cooking plate 16 is set forth in FIG. 4 illustrating the wiring arrangement wherein the respective positive contact rings 46 electrically connect at the junction 78 and then run to the plug 32 by utilizing a common circuit wire 80. Similarly, the negative contact rings 48 connect at a junction 82 and lead to the male electrical plug 32 by employing a common wire 84. As best seen in FIG. 7, the cover interlock switch 34 connects in series with the circuit 36 to thereby interrupt the electrical circuit when the cover 14 is pivoted to its open position 38 as in FIG. 1. Upon closing of the cover over the base 12, the switch 34 automatically closes to thereby close the electrical circuit 36 at this switch. An electrical timer 26 inserts in series into the circuit 36 to thereby control the time period of operation of the electrical circuit in well-known manner. In view of the series connection of the timer switch 26, it can be appreciated that no current can flow in the circuit until such time as the timer switch 26 is manually turned by the operator. The cooking unit 10 is energized in well-known manner by connecting a circuit connected electrical flexible cord 74 to an ordinary electrical receptacle (not shown) such as commonly found in residences and places of business utilizing a male plug 70 in the usual manner.

In order to use our invention, the plug 70 is introduced into an electrical receptacle 72 to thereby ready the circuit 36 for operation. Containers 42 filled with food of the desired nature are then inserted into the cooking unit by applying the sidewall 56 to the cooking plate opening 44 with the bottom 54 facing downwardly. It will be appreciated that the bottom 54 of each container 42 is formed to a diameter smaller than the diameter of the cooking plate opening 44 so that the container readily sits within the opening for the purposes of stability. The conical configuration of the container sidewall is so designed that the cross-sectional diameter of the sidewall at a location below the lip 64 will equal the diameter of the opening 44. In this manner, the food container 42 suspends within the opening 44 in a secure and stable manner to thereby prevent spilling, tipping, or overturning. Care should be exercised to assure that the portions of the electrodes 58, 60 extending downwardly over the outside wall 62 of the container 42 contact the contact rings 46, 48 and not the spaces 50, 52 between the rings. In this manner, a positive contact can be assured between the electrodes 58, 60 and the respective contact rings 46, 48 to thereby complete the electrical circuit.

The food containers 42 place within the cooking plates openings 44 and position in a manner to enable the electrodes 58, 60 to overlie the contact rings 46, 48 in direct contact therewith. In this manner, electrical current from the circuit 36 flows through the contact rings 46, 48 respectively to the electrodes 58, 60. As hereinbefore mentioned, the food within the containers 42 serves to complete the electrical circuit across the opening 68 between the electrodes once the container has been properly positioned upon the cooking plate 16. The cover 14 must then be rotated from its open position 38 to the closed position overlying the enclosing base 12 to thereby close the cover interlock 34 to complete the electrical circuit 36. With the cooking unit so armed, the timing circuit control switch 26 should then be rotated to activate the circuit for a timed interval to thereby energize the contact rings 46, 48 so that electrical current may be directly applied to the food within the container 42 through electrodes 58, 60. Because of the direct current applied to the food across the electrodes the required cooking period can thereby be minimized and it is anticipated that food may be palatably prepared for eating in a period of 45 seconds or less.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim:

1. An electrically heated, deep-dish cooking unit comprising:
   A. a cooking plate:
      1. said cooking plate being substantially flat and formed of electrically nonconductive material;
      2. said cooking plate being provided with a food container receiving opening therein; said opening being shaped and sized to support a food container;
   B. a pair of split contact rings affixed to the periphery of the said container opening:

1. said rings being affixed about the said opening to inwardly overlie portions of the said opening;
2. said rings being positioned over the said opening to provide electrical circuit opening spaces therebetween;

C. an electrical circuit being normally open and terminating in a pair of open terminals:
  1. each of said circuit terminals terminating respectively at one of the said contact rings in an electrically conductive connection;

D. a deep-dish container insertable within the said cooking plate opening:
  1. said container having an open top, a closed bottom, and a peripheral sidewall connecting the said top and bottom in a moisturetight construction;
  2. the cross-sectional configuration of the said top being larger than the cross-sectional configuration at the said container bottom;
  3. the said sidewall peripherally inwardly overlying split contact rings to thereby support the container in cooking position upon the said cooking plate; and E. a pair of spaced, flat, electrically-conductive electrodes affixed to the said container:
  1. said electrodes being affixed both to the inside and the outside of the said container sidewall in a continuous strip a portion of the said electrodes outside of said contact rings in electrically conductive contacts;
  2. said electrodes covering a relatively large area over the surface of the said inside of the container sidewall and bottom; and
  3. said electrodes being inwardly spaced from each other a distance sufficient to prevent completion of the electrical circuit across the electrodes, whereby food placed within the food container inwardly contacts the said electrodes and completes the electrical circuit across the electrodes to thereby heat the said food to palatable temperature in a minimum period of time.

2. The invention of claim 1 wherein the said cooking plate opening is circularly formed and wherein the said contact rings arcuately cover portions of the periphery of the said circular opening.

3. The invention of claim 1 wherein the said cooking plate opening is circularly formed, the said contact rings arcuately covering portions of the periphery of the said circular opening, and wherein the said cooking container is fabricated to a frustoconical configuration.

4. The invention of claim 1 wherein the said cooking plate opening is circularly formed, the said contact rings arcuately covering portions of the periphery of the said circular opening and wherein the said cooking container is fabricated to a frustoconical configuration, the cross-sectional area of the bottom of the said container being less than the circular area of the said opening, and the cross-sectional area at the top of said container being greater than the area of the said circular opening whereby the sidewall of the said container contacts the periphery of the said contact rings.

5. The invention of claim 1 wherein the said electrodes are fabricated of thin metalic foil of relatively large area.

6. The invention of claim 1 wherein the said electrodes are fabricated of thin metallic foil of relatively large area and wherein the said foil is laminated directly to the interior and exterior surfaces of the said container sidewall construction.